April 28, 1970   J. D. CAVALLARI, JR., ET AL   3,508,540
APPARATUS FOR DIRECT MEASUREMENT OF SKIN CONDUCTANCE
Filed Feb. 14, 1967
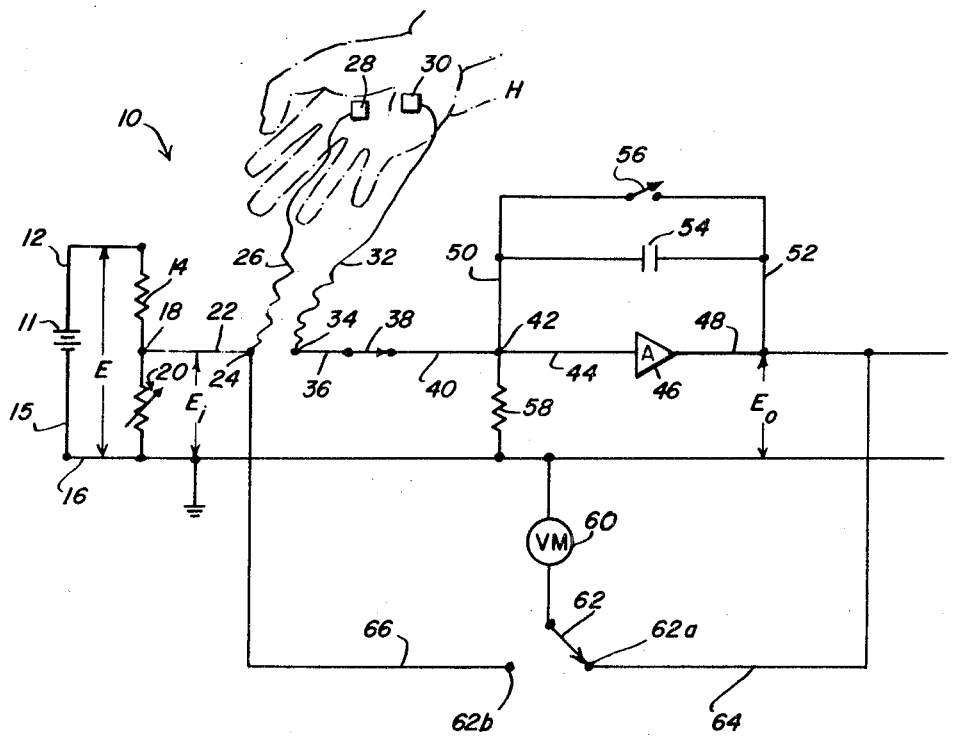
John D. Cavallari, Jr.
John E. Suwara
INVENTORS
BY
Attys

United States Patent Office 3,508,540
Patented Apr. 28, 1970

3,508,540
APPARATUS FOR DIRECT MEASUREMENT
OF SKIN CONDUCTANCE
John D. Cavallari, Jr., New Hyde Park, and John E.
Suwara, Bronx, N.Y., assignors to the United States of
America as represented by the Secretary of the Navy
Filed Feb. 14, 1967, Ser. No. 616,445
Int. Cl. A61b 5/05
U.S. Cl. 128—2.1          7 Claims

ABSTRACT OF THE DISCLOSURE

An apparatus for direct measurement of averaged skin conductance comprising an operational amplifier circuit including a capacitor as the feedback impedance, the amplifier circuit being connected to electrode means so as to integrate a voltage input to the amplifier circuit through the skin of a subject when contacted by the electrode means, and indicator means connected to the amplifier circuit output.

---

The invention described herein may be manufactured and used by or for the Government of the United States of America for governmental purposes without the payment of any royalties thereon or therefor.

Background of the invention

In the past, the average skin conductance was obtained in the following manner. A graphical plot of instantaneous skin resistance was obtained using a strip chart recording. The recorder was connected to a resistance bridge. One leg of the bridge circuit was the human subject. Due to the large variations of human skin resistance, the researcher was required to monitor constantly the output of the bridge and frequently rebalance the bridge circuit. The average skin resistance, per trial, was obtained by a time consuming graphical analysis. This analysis consisted of a visual estimate of the average skin resistance. The average skin conductance was then obtained by consulting a table of reciprocals for each value of average skin resistance. Disadvantages of this method are that a strip chart recorder is required and constant monitoring and rebalancing of resistance bridge are necessary. Moreover, instantaneous data is not available and the entire procedure has been time consuming and often produced an inaccurate analysis.

Summary of the invention

With the foregoing in mind, it is a primary object of the present invention to provide apparatus for obtaining direct measurement of averaged skin conductance without requiring graphical plots, resort to tables of reciprocals, and the like, and which will provide instantaneous values.

It is another object of the invention to provide apparatus for obtaining direct measurements of averaged skin conductance which apparatus does not require constant monitoring and frequent rebalancing of the apparatus.

As another object, the invention aims to accomplish the foregoing in a novel and practical manner through the provision of an operational amplifier circuit including a capacitor as the feedback means, and means including electrode means for providing a voltage input corresponding to skin conductance, the operational amplifier circuit being operative to integrate the voltage input thereto, and indicator means connected to amplifier circuit output.

Brief description of the drawings

The invention may be further said to reside in certain combinations and arrangements of parts whereby the foregoing objects and advantages are achieved together with other objects and advantages which will become apparent from the following detailed description when read in conjunction with the accompanying sheet of drawings in which the sole figure is a schematic illustration of a skin conduction measuring apparatus embodying the present invention.

Description of the preferred embodiment

In the form of the invention illustrated in the drawings and described hereinafter there is provided an apparatus 10 for directly measuring the averaged skin conductance of a subject, for example for psychological test purposes. The apparatus 10 comprises a source of D.C. potential $E$, represented in this example by a battery 11. Of course other stable sources of D.C. potential such as regulated D.C. power supplies could be used.

One side of the battery 11 is connected by a conductor 12 to one lead of a resistor 14, while the other side of the battery is connected by a conductor 15 to a conductor 16 which is representative of ground potential in the apparatus. The other end of resistor 14 is connected at junction 18 to one end of a resistor 20. The resistor 20 has its other end connected to the ground conductor 16 and, together with resistor 14, forms a voltage divider network providing at junction 18 and a conductor 22 connected thereto, an input voltage $E_i$. The resistor 20 is preferably adjustable, as shown, to permit adjustment of the input voltage $E_i$.

Connected to the conductor 22, as at a terminal 24, is a flexible wire 26 which is connected to one of a pair of electrodes 28, 30, the latter being connected by a flexible wire 32 to a terminal 34. A conductor 36 connects terminal 34 to one side of a switch 38. The other side of switch 38 is connected by a conductor 40 to a summing junction 42, explained more fully hereinafter, and by a conductor 44 to the input side of an operational amplifier 46. The electrodes 28, 30 are adapted to be connected to the skin of a subject, for example on palm of the subject's hand H. The conductivity of the skin between the electrodes varies with emotional stress or the like experienced by the subject, and the averaged conductivity may be determined by use of the apparatus 10.

By operational amplifier is meant a D.C. amplifier of relatively stable and linear response characteristics, and having relatively high input and low output impedances, all as is well known to those skilled in the art to which the invention pertains. Such amplifiers which are capable of being connected in a circuit which performs mathematical operations such as adding, multiplying, integration, and differentiation are known as operational amplifiers and the circuits as operational amplifier circuits.

The output $E_o$ of amplifier 46 appears between a conductor 48 and the ground conductor 16. Connected across the amplifier 46 by conductors 50, 52 is a capacitor 54 which is in feedback relation to the amplifier 46, and a switch 56 is connected in parallel with the capacitor for a purpose which will presently be made apparent.

A stabilizing resistor 58 is preferably provided between the summing junction 42 and the ground conductor 16. The circuitry is completed with the provision of indicator means such as a voltmeter 60 which is connected on one side to the ground conductor 16 and is adapted by a switch 62, having a first position engaging a contact 62a and a second position engaging a contact 62b, to be alternatively connected either through a conductor 64 to conductor 48 so as to indicate the output $E_o$ of the operational amplifier circuit, or through a conductor 66 to conductor 22 to indicate the input voltage $E_i$. The voltmeter 60 may be of any conventional type such as one of the well known vacuum tube voltmeters or a digital voltmeter.

In operation, the skin of the subject provides the input impedance to the operational amplifier circuit and the capacitor 54 provides the feedback impedance necessary for effecting the desired integrating function of the circuit. The maximum allowable current flow through the subject's skin between the electrodes 28, 30 has been found to be 10 microamps since any current in excess of this value may cause an off-set potential to be developed across the electrodes. In addition, the excess current may stimulate muscular activity, resulting in the generation of muscular potentials that mask the desired signal.

To satisfy the 10 microamp maximum current requirement, passing through the electrodes 28, 30, the voltage $E_i$ at terminal 24 is preferably biased to .10 volt by selection of resistor 14 and adjusting resistor 20. The maximum value of resistors 14 and 20 should be limited to 1000 ohms to prevent loading of the circuit, while the resistor 58 may be on the order of several megohms in value.

The generalized transfer function for the circuit is:

$$E_o = -\left(\frac{Z_f}{Z_i}\right) E_i \quad (1)$$

where $Z_f$ is the feedback impedance of capacitor 54 and $Z_i$ is the input impedance of the subject's skin between the electrodes.

In La Placean notation $$Z_f = \frac{1}{sC}$$

and $$Z_i = R_s = \frac{1}{G_s}$$

where C is the capacitance of capacitor 54, $R_s$ is the resistance of the skin between the electrodes, and $G_s$ is the conductance of the skin therebetween.

Thus, Equation 1 can be rewritten as:

$$E_o = \frac{-0.1 G_s}{sC} = -\left(\frac{0.1}{C}\right) \int_0^T G_s dt \quad (2)$$

The average skin conductance of a human over a period of time T is:

$$G_{av} = \frac{1}{T} \int_0^T G_s dt \quad (3)$$

Substituting Equation 3 into Equation 2 yields:

$$E_o = -\left(\frac{0.1T}{C}\right) G_{av} \quad (4)$$

Solving Equation 4 for $G_{av}$ yields:

$$G_{av} = -\left(\frac{10C}{T}\right) E_o \quad (5)$$

The averaged skin conductance of period T is, therefore, directly proportional to the output voltage $E_o$ of the operational amplifier circuit. Accordingly, the voltmeter 60 can be calibrated to read directly in micromhos the conductance of skin between the electrodes 28 and 30, as well as volts, when the switch 62 engages contact 62a.

For a particular series of measurements, the values of C and T are constants. The capacitance C of capacitor 54 is conveniently either 1 or 10 microfarads, while T can vary from 50 milliseconds to 100 seconds for operational amplifiers having a linear output between plus and minus 100 volts.

The various modes of operation of the described circuit includes the following: with switch 56 closed and switch 38 in any position, the output $E_o$ of the circuit will be zero; with switch 56 open and switch 38 closed, the amplifier integrates the input voltage over time; and with switch 56 open and switch 38 open the output voltage $E_o$ is stored.

The described apparatus 10 is easily capable of measuring and averaging skin conductances varying between 2 micromhos and 100 micromhos, which is the maximum range generally observed for humans, with accuracy within one percent.

What is claimed is:
1. Apparatus for measurement of average skin conductance, said apparatus comprising:
   a source of D.C. potential with respect to a ground conductor;
   first electrode means;
   voltage adjusting means connected between said source and said first electrode means for providing an input voltage between said first electrode means and said ground conductor;
   an operational amplifier having input and output connections;
   second electrode means connected to said input connection;
   a feedback capacitor connected between said output and input connections; and
   voltage responsive indicator means connected between said output connection and said ground conductor.
2. Apparatus as defined in claim 1 and further comprising a stabilizing resistor connected between said input connection and said ground conductor.
3. Apparatus as defined in claim 2 and wherein said voltage adjusting means comprises:
   a voltage divider network;
   said voltage divider network comprising at least one variable resistor.
4. Apparatus as defined in claim 3 and further comprising switch means connected in parallel with said feedback capacitor and operative between open and closed positions.
5. Apparatus as defined in claim 4 and further comprising:
   second switch means connected in series between said second electrode means and said input connection, said second switch means being operative between open and closed positions.
6. Apparatus as defined in claim 5 and wherein said indicator means comprises voltmeter means calibrated in terms of micromhos of skin conductance.
7. Apparatus as defined in claim 5 and further comprising a third switch means operable between a first position connecting said indicator means to said output connection, and a second position connecting said indicator means to said first electrode means for indicating said input voltage.

References Cited
UNITED STATES PATENTS

| | | | |
|---|---|---|---|
| 2,308,933 | 1/1943 | Raesler | 128—2.1 |
| 2,339,579 | 1/1944 | Milne et al. | 128—2.1 |
| 2,535,249 | 12/1950 | Wilhelm et al. | 128—2.1 |
| 2,799,269 | 7/1957 | Mathison | 128—2.1 |
| 2,829,638 | 4/1958 | Douglas | 128—2.1 |
| 3,085,566 | 4/1963 | Tolles | 128—2.1 |
| 3,129,326 | 4/1964 | Balaban | 328—127 XR |
| 3,145,297 | 8/1964 | Felix | 328—127 XR |
| 3,174,478 | 3/1965 | Kahn | 128—2.06 |
| 3,316,897 | 5/1967 | Weidinger et al. | 128—2.06 |
| 3,381,230 | 4/1968 | Gilbert et al. | 328—127 |

RICHARD A. GAUDET, Primary Examiner

K. L. HOWELL, Assistant Examiner

U.S. Cl. X.R.

328—127